(12) United States Patent
Johnson

(10) Patent No.: US 7,111,704 B2
(45) Date of Patent: Sep. 26, 2006

(54) HYDROSTATIC DRIVE APPARATUS FOR A ROAD VEHICLE

(75) Inventor: Truman G. Johnson, Urbana, OH (US)

(73) Assignee: Johnson Welded Products, Inc., Urbana, OH (US)

( * ) Notice: Subject to any disclaimer, the term of this patent is extended or adjusted under 35 U.S.C. 154(b) by 264 days.

(21) Appl. No.: 10/768,249

(22) Filed: Jan. 30, 2004

(65) Prior Publication Data

US 2005/0167178 A1 Aug. 4, 2005

(51) Int. Cl.
*B60K 6/12* (2006.01)

(52) U.S. Cl. ...................... 180/307; 180/308

(58) Field of Classification Search ............... 180/305, 180/306, 307, 308
See application file for complete search history.

(56) References Cited

U.S. PATENT DOCUMENTS

| | | | |
|---|---|---|---|
| 3,303,901 A | 2/1967 | Schou | |
| 4,413,698 A * | 11/1983 | Conrad et al. | 180/305 |
| 4,470,475 A | 9/1984 | Carlson | |
| 4,503,928 A | 3/1985 | Mallen-Herrero | |
| 4,803,969 A * | 2/1989 | Hiereth et al. | 123/561 |
| 4,903,792 A | 2/1990 | Ze-ying | |
| 5,168,703 A * | 12/1992 | Tobias | 60/418 |
| 5,230,402 A * | 7/1993 | Clark et al. | 180/307 |
| 5,533,333 A * | 7/1996 | Pullar et al. | 60/327 |
| 5,607,027 A | 3/1997 | Puett, Jr. | |
| 5,810,106 A | 9/1998 | McCoy | |
| 5,847,470 A | 12/1998 | Mitchell | |
| 5,957,235 A | 9/1999 | Nishimura | |
| 6,176,085 B1 | 1/2001 | Kirakos | |
| 6,223,844 B1 * | 5/2001 | Greenhill et al. | 180/65.3 |
| 6,311,487 B1 * | 11/2001 | Ferch | 60/413 |
| 6,431,298 B1 | 8/2002 | Ruppert, Jr. | |
| 6,454,033 B1 * | 9/2002 | Nathan et al. | 180/65.1 |
| 6,464,028 B1 * | 10/2002 | Imani | 180/65.2 |
| 6,601,474 B1 | 8/2003 | Ishimaru | |
| 6,708,787 B1 * | 3/2004 | Naruse et al. | 180/53.8 |
| 6,862,885 B1 * | 3/2005 | Mitchell | 60/606 |
| 6,922,997 B1 * | 8/2005 | Larson et al. | 60/611 |
| 2005/0223706 A1 * | 10/2005 | Mitchell et al. | 60/606 |

OTHER PUBLICATIONS

Eaton-Vickers, Electro-hydraulic Hydrostatic Transmission System, M-SYEH-MR001-E, Mar. 2003, pp. 1-7.
Website of Superdrive, Inc www.superdriveinc.com.

* cited by examiner

*Primary Examiner*—Jeff Restifo
(74) *Attorney, Agent, or Firm*—Mark A. Navarre

(57) ABSTRACT

A road vehicle utilizes hydraulic machines for primary and accessory vehicle drive functions. An internal combustion engine directly drives a first variable capacity hydraulic machine selectively operable as pump or motor, an electric machine electrically coupled to a storage battery is selectively operable as motor or generator and is mechanically coupled to a second hydraulic machine operable as pump or motor, and at least one hydraulic drive motor is coupled to a vehicle drive wheel. A controller regulates the capacity of the first hydraulic machine, and controls the functionality of the first and second hydraulic machines to selectively crank the engine or charge the storage battery. The first hydraulic machine also supplies hydraulic fluid to accessory drive motors including a power steering drive motor, an air compressor drive motor and a supercharger drive motor.

8 Claims, 2 Drawing Sheets

HYDROSTATIC DRIVE APPARATUS FOR A ROAD VEHICLE

TECHNICAL FIELD

The present invention relates to road vehicles such as semi-tractor-trailers, and more particularly to hydrostatic drive arrangements for efficient operation of the vehicle engine and accessories.

BACKGROUND OF THE INVENTION

Heavy-duty road vehicles such as straight trucks and semi-tractor trailers are customarily equipped with a powerful diesel engine that mechanically drives not only the vehicle but also a generator or alternator and various accessory pumps for braking and steering systems. In a typical configuration, the engine output shaft is coupled to the vehicle drive wheels through a manual or automatic transmission and one or more differential gearsets, and a power-take-off or belt-drive is used to drive the accessory systems. While this configuration has become standardized in the trucking industry, it necessarily results in vehicles that are costly, overly-heavy and only marginally efficient. For example, the drivetrain weight is very heavy, the engine frequently runs at high fuel consumption operating points, and the accessory pumps and motors are driven continuously and at variable engine-related speeds. Certain of these drawbacks have been addressed in industrial and heavy-duty off-road vehicles through the use of hydrostatic drive arrangements, and there is at least one company (Superdrive Inc., Piqua, Ohio) in the business of retrofitting heavy-duty road vehicles with hydrostatic drives. However, the cost and efficiency gains could be further improved in vehicles originally designed and manufactured to utilize hydrostatic drive arrangements.

SUMMARY OF THE INVENTION

The present invention is directed to an improved road vehicle in which hydraulic machines selectively operable as pump or motor are extensively utilized to advantage for primary and accessory vehicle drive functions. An internal combustion engine directly drives a first variable capacity hydraulic machine selectively operable as pump or motor, and at least one hydraulic drive motor is coupled to a vehicle drive wheel. An electric machine selectively operable as motor or generator is electrically coupled to a storage battery and mechanically coupled to a second hydraulic machine operable as pump or motor. A controller regulates the capacity of the first hydraulic machine, and controls the functionality of the first and second hydraulic machines to selectively crank the engine or charge the storage battery. During engine operation, the first hydraulic machine also supplies hydraulic fluid to accessory drive motors, including a power steering drive motor, an air compressor drive motor and optionally a supercharger drive motor.

BRIEF DESCRIPTION OF THE DRAWINGS

The present invention will now be described, by way of example, with reference to the accompanying drawing, in which:

FIG. 2A depicts a first embodiment, whereas FIG. 2B depicts a second embodiment.

DESCRIPTION OF THE PREFERRED EMBODIMENT

The present invention is disclosed herein primarily in the context of a roadway vehicle such as a truck equipped with a continuously variable hydrostatic drive. However, it will be understood that the invention is also applicable to other types of vehicles.

Figure 1:
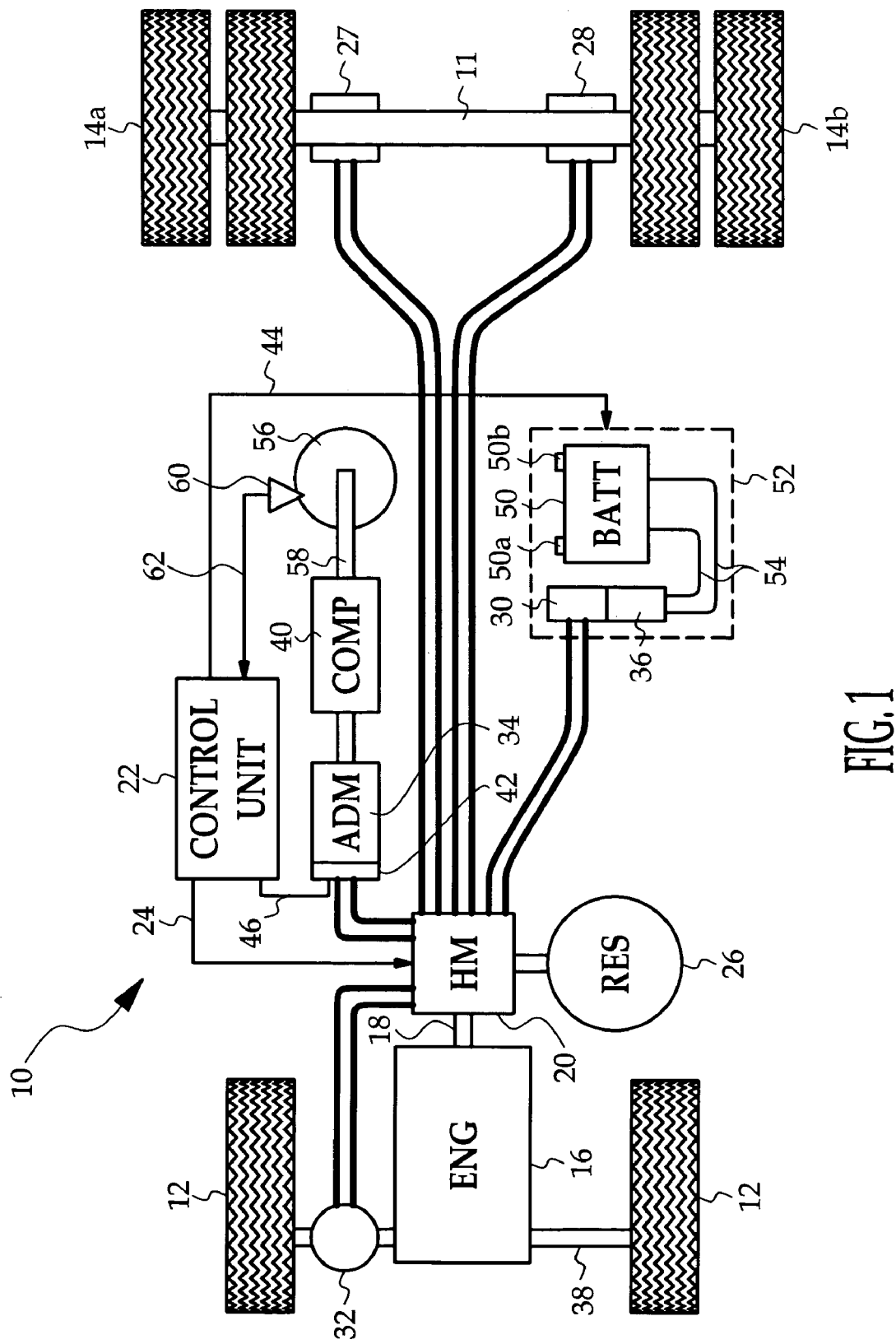
FIG. 1 is a diagram of a vehicle primary and accessory drive arrangement embodying the principles of the present invention.

Referring to FIG. 1, the reference numeral 10 generally designates a road vehicle such as a heavy-duty truck. The various components depicted in FIG. 1 are mounted on a chassis including a pair of longitudinal frame rails which are not shown and the frame cross-member 11 which is shown. The vehicle has front wheels/tires 12, and at least one set of rear wheels/tires 14a, 14b. The engine (ENG) 16, which is typically a turbocharged diesel engine, includes an output shaft 18 coupled to drive a variable capacity hydraulic machine (HM) 20. The hydraulic machine 20 is operated under the control of a microprocessor-based control unit 22, as indicated by the line 24. During operation of the engine 16, the control unit 22 operates hydraulic machine 20 as a pump for supplying hydraulic fluid from reservoir 26 to various other vehicle components, including hydraulic drive motors 27, 28, a hydraulic starter/charger machine 30, a power steering unit 32 and an accessory drive motor (ADM) 34. Mechanically, the drive motors 27, 28 are coupled to the rear wheels 14a, 14b, respectively, the hydraulic machine 30 is coupled to an electric machine 36, the steering unit 32 is coupled to a steering tie-rod 38, and the accessory drive motor 34 is coupled to an air compressor (COMP) 40. The hydraulic starter/charger machine 30 and an electrically actuated valve assembly 42 for accessory drive motor 34 are also operated by the control unit 22 as indicated by the lines 44 and 46.

Figure 2A:
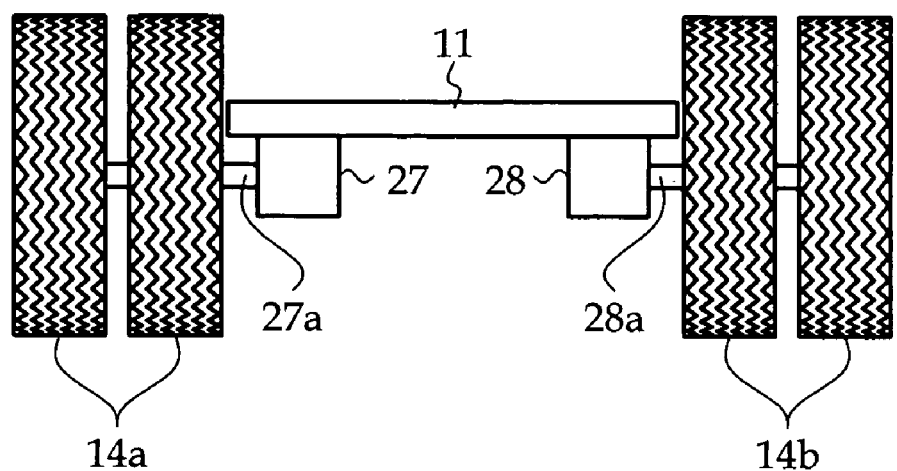
FIGS. 2A and 2B depict alternate drive arrangements for the vehicle drive wheels.
Figure 2B:
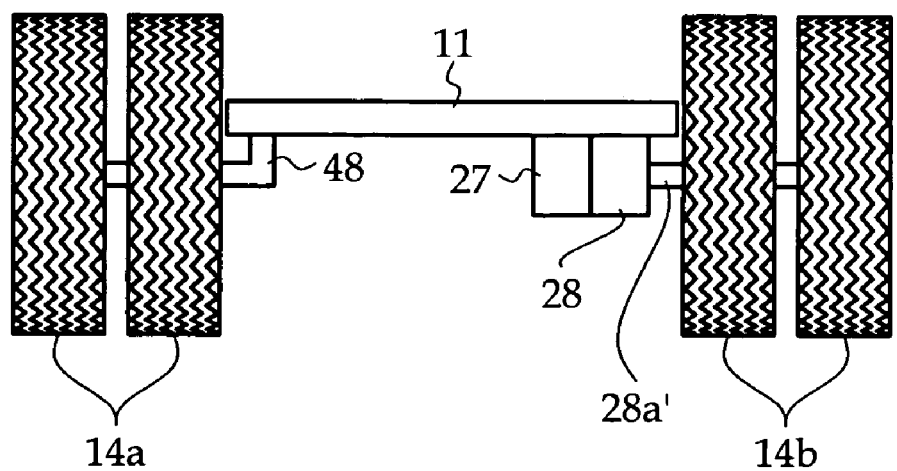

As most clearly illustrated in FIG. 2A, the hydraulic drive motors 27 and 28 are mounted on the underside of frame cross-member 11. The output shaft 27a of drive motor 27 drives the wheel/tire set 14a, and the output shaft 28a of drive motor 28 drives the wheel/tire set 14b. FIG. 2B depicts an alternate embodiment in which the drive motors 27 and 28 are ganged together to form a common drive shaft 28a' for driving the wheel/tire set 14b; in this case, the wheel/tire set 14a free-wheels on a stub-shaft 48 of frame cross-member 11. In vehicles such as semi-tractors having a second set of rear wheels/tires, the drive motor 27 can be coupled to drive one wheel/tire set of the first set, and the drive motor 28 can be coupled to drive one wheel/tire set of the second set; in such an implementation, it may be advantageous to arrange the drive motors so that there is one driven wheel/tire set on each side of the vehicle 10. These arrangements eliminate the differential gearset used in a conventional (mechanical or hydrostatic) vehicle powertrain. In any event, the control unit 22 controls electrically actuated valves within the hydraulic machine 20 to independently control the supply of fluid to the drive motors 27 and 28. The drive motors 27, 28 are preferably oppositely configured with respect to their speed/torque characteristics so that the hydraulic machine 20 is controlled to supply fluid primarily to one of the drive motors 27, 28 at any given time. For example, the drive motor having the high torque/low speed characteristic may be used primarily to launch the vehicle and at vehicle speeds below, say 40 MPH, whereas the drive motor having the low torque/high speed characteristic may be used primarily at vehicle speeds above 40 MPH. Of course, hydraulic fluid may be supplied to both drive motors 27, 28 under specified conditions defined by software routines executed by control unit 22.

Referring again to FIG. 1, the steering unit 32 may be any conventional power steering mechanism, the primary difference being that the hydraulic machine 20 takes the place of a separate power steering pump used in a conventional vehicle powertrain.

The starter/charger hydraulic machine 30 is preferably housed in a compartment with the electric machine 36 and the vehicle storage battery (BATT) 50, as indicated by the box 52. The electric machine 36 is electrically coupled to internal positive and negative plates of the storage battery 50 by the cables 54, and mechanically coupled to the hydraulic machine 30 as mentioned above. The battery 50 has positive and negative external terminals 50a, 50b for connection to various electrical components of the vehicle, including the control unit 22. The control unit 22 electrically configures the hydraulic machine 30 as a pump or motor, and the electric machine 36 as a motor or generator, depending on the engine mode of operation. During a starting mode of the engine 16, the control unit 22 configures the hydraulic machines 20 and 30 as motor and pump, respectively, while configuring the electric machine 36 as a motor. In this mode, the battery 50 sources electric current to electric machine 36 to drive hydraulic machine 30 for supplying hydraulic fluid to hydraulic machine 20, which cranks engine 16 by rotating the drive shaft 18. During a running mode of the engine 16, the control unit 22 configures the hydraulic machines 20 and 30 as pump and motor, respectively, while configuring the electric machine 36 as a generator. In this mode, the engine-driven hydraulic machine 20 supplies hydraulic fluid to hydraulic machine 30 for rotating the electric machine 36, which produces and supplies charging current to battery 50 via cables 54. Thus, a single electric machine 36 performs both starting and generating functions, eliminating the separate starter or generator/alternator used in a conventional vehicle powertrain. Additionally, the hydraulic connection between the machines 20 and 30 allows the electric machine 36 to be located remote from the engine 16, and in close proximity to the storage battery 50, as indicated in FIG. 1. This improves the thermal efficiency of electric machine 36 and minimizes the voltage drops that occur with long lengths of electrical wiring between generator and battery.

The control unit 22 operates the electrically actuated valve assembly 42 to selectively activate and deactivate accessory drive motor 34. When the valve assembly 42 is activated during engine operation, the air compressor 40 delivers high pressure air to air tank 56 via air hose 58 and a dryer (not shown). An electrical pressure sensor 60 measures the pressure in tank 56, and provides a corresponding signal to control unit 22 via line 62. When the measured pressure reaches an upper threshold, the control unit 22 actuates valve assembly 42 to deactivate accessory drive motor 34, turning air compressor 40 off. When the measured pressure subsequently falls below a lower threshold, the control unit 22 actuates valve assembly 42 to activate accessory drive motor 34, turning air compressor 40 back on. Alternately, the sensor 60 may be an electronic governor having an internal mechanism for comparing the measured pressure to calibrated upper and lower set points; in such case, the sensor 60 provides an on/off input to the control unit 22 for controlling the valve assembly 42. In any event, the air compressor 40 is cycled on and off on a demand basis, as opposed to the conventional approach where the engine continuously drives the air compressor and a mechanical governor valve variably throttles the compressor air intake to regulate the air pressure in tank 56. The approach of this invention eliminates the drive losses associated with unnecessary compressor operation, resulting in improved engine fuel efficiency, and at the same time, improves the overall reliability of the system by replacing a failure-prone mechanical governor with an electronic pressure sensor.

Although not illustrated in FIG. 1, it is feasible to extend hydrostatic drive components to other vehicle systems where the overall efficiency and/or system cost may thereby be reduced. For example, it may be beneficial to include an accessory drive motor (operated by fluid from hydraulic machine 20) for operating a supercharger either on demand or under specified operating conditions of engine 16. Other functions such as those conventionally performed with mechanical, electrical or pneumatic couplings may also be carried out with hydrostatic drive components. Also, it will be recognized that the frame cross-member 11 may be live instead of fixed, and so on. It is anticipated that these and other modifications will occur to persons skilled in the art; accordingly, it should be understood that the present invention is not limited by the illustrated embodiment, but rather by the appended claims.

The invention claimed is:

1. Hydrostatic drive apparatus for a road vehicle, comprising in combination:
   an internal combustion engine;
   a hydrostatic drive including a first hydraulic machine selectively operated as a pump or a motor and mechanically coupled to said engine, at least one hydraulic drive motor fluidically coupled to said first hydraulic machine and mechanically coupled to a drive wheel of said vehicle to propel said vehicle when said first hydraulic machine is operated as a pump;
   an electric machine;
   a storage battery electrically coupled to said electric machine;
   a second hydraulic machine selectively operated as a pump or a motor, mechanically coupled to said electric machine and fluidically coupled to said first hydraulic machine; and
   a controller effective (1) during a cranking mode of operation to operate said first and second hydraulic machines as motor and pump, respectively, so that said electric machine is driven by said storage battery to supply fluid from said second hydraulic machine to said first hydraulic machine to crank said internal combustion engine, and (2) during a run mode of operation to operate said first and second hydraulic machines as pump and motor, respectively, so that fluid is supplied from said first hydraulic machine to said second hydraulic machine for mechanically driving said electric machine to generate charging current for said storage battery.

2. A hydrostatic drive apparatus according to claim 1, wherein said electric machine and second hydraulic machine are packaged in proximity to said storage battery, remote from said engine.

3. A hydrostatic drive apparatus according to claim 1, further comprising:
   an air storage tank;
   an air compressor for delivering compressed air to said storage tank;
   an auxiliary hydraulic drive motor mechanically coupled to said air compressor and fluidically coupled to said first hydraulic machine, so that fluid is supplied from said first hydraulic machine to said auxiliary hydraulic drive motor to drive said air compressor during said run mode of operation.

4. A hydrostatic drive apparatus according to claim 3, including an electro-hydraulic valve apparatus operated by said controller for selectively coupling said auxiliary hydraulic motor to said first hydraulic machine to selectively activate and deactivate said air compressor.

5. A hydrostatic drive apparatus according to claim 4, including a sensor for measuring an air pressure in said storage tank, said controller operating said electro-hydraulic valve apparatus to selectively activate and deactivate said air compressor based on the measured air pressure.

6. A hydrostatic drive apparatus according to claim 1, where said vehicle includes a frame cross-member extending perpendicular to a longitudinal axis of said vehicle above a drive axle of said drive wheel, and said at least one hydraulic drive motor is suspended from said frame cross-member.

7. A hydrostatic drive apparatus according to claim 6, where said vehicle includes first and second oppositely disposed drive wheels, the hydrostatic drive apparatus comprising:

first and second hydraulic drive motors suspended from said frame cross-member and mechanically coupled to said first and second drive wheels, respectively, for propelling said vehicle when said first hydraulic machine is operated as a pump.

8. A hydrostatic drive apparatus according to claim 6, where said vehicle includes first and second oppositely disposed drive wheels, said at least one hydraulic drive motor is coupled to drive said first drive wheel, and said second drive wheel is supported on a stub shaft suspended from said frame cross-member.

* * * * *